(12) United States Patent
Furuki

(10) Patent No.: US 7,208,893 B2
(45) Date of Patent: Apr. 24, 2007

(54) MOTOR DRIVING CONTROL DEVICE TO BE DRIVEN AT INTERVAL OF CONSTANT TIME

(75) Inventor: Shigeru Furuki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/328,745

(22) Filed: Jan. 10, 2006

(65) Prior Publication Data
US 2006/0158140 A1    Jul. 20, 2006

(30) Foreign Application Priority Data

| Jan. 11, 2005 | (JP) | ............................. 2005-003914 |
| Jan. 11, 2005 | (JP) | ............................. 2005-003922 |

(51) Int. Cl.
*H02P 5/46* (2006.01)

(52) U.S. Cl. .................. 318/68; 318/432; 318/431; 318/433; 318/138; 318/429; 318/254; 318/434

(58) Field of Classification Search ................ 318/68, 318/432, 433, 434, 431, 254, 138, 439, 592, 318/599, 811, 568.17, 632, 560
See application file for complete search history.

(56) References Cited

U.S. PATENT DOCUMENTS

| 5,809,438 A | * | 9/1998 | Noro et al. ................... 701/41 |
| 5,886,491 A | * | 3/1999 | Yoshida et al. .............. 318/592 |
| 6,066,930 A | | 5/2000 | Horiguchi et al. |
| 6,854,352 B2 | | 2/2005 | Onodera |

FOREIGN PATENT DOCUMENTS

| EP | 0 827 266  | 6/2001 |
| JP | 05-236797  | 9/1992 |
| JP | 10-80194   | 3/1998 |
| JP | 2003-22159 | 1/2003 |

* cited by examiner

*Primary Examiner*—Karen Masih
(74) *Attorney, Agent, or Firm*—Brinks Hofer Gilson & Lione

(57) ABSTRACT

A motor driving control device includes a motor, a switch unit that controls driving of the motor, a current detection resistor that outputs a detection voltage indicating a current of the motor, a comparator that compares the detection voltage with a target current value, an on signal generating unit that generates an on signal, a polarity of which is changed for each interval of predetermined time, and a control unit that has the comparator, a holding circuit receiving the on signal to change a circuit state. When a change in polarity of the on signal is detected, the holding circuit holds the circuit state such that the switch unit is turned on and a current is supplied to the motor. When the comparator detects that the current of the motor is increased to the target current value, the holding circuit holds the circuit state such that the switch unit is turned off.

7 Claims, 11 Drawing Sheets

MOTOR DRIVING CONTROL DEVICE TO BE DRIVEN AT INTERVAL OF CONSTANT TIME

BACKGROUND OF THE INVENTION

1. Field of the Invention

The present invention relates to a motor driving control device, and more particularly, to a motor driving control device which can be suitably used in an input apparatus with an operation feeling imparting function of imparting an operation feeling to a manual operating member connected to a rotational shaft of a motor.

2. Description of the Related Art

In the related art, in a motor driving control device, which selectively rotates a direct-current motor in one direction or in a reverse direction, a bridge driving circuit, in which four switching elements are brought into H-type bridge connection, together with the direct-current motor, is used. In this case, the H-type bridge driving circuit is configured such that first and second switching elements are connected between a power supply and a reference potential point in series, third and fourth switching elements are connected between the power supply and the reference potential point in series and in parallel with the first and second switching elements, and the direct-current motor is connected between a connection point of the first and second switching elements and a connection point of the third and fourth switching elements. And then, in case of rotating the direct-current motor in one direction, the first and fourth switching elements may be turned on, and the second and third switching elements may be turned off. In contrast, in case of rotating the motor in the reverse direction, the first and fourth switching elements may be turned off, and the second and third switching elements may be turned on.

Various H-type bridge driving circuits for driving the direct-current motor are known till now. As the representative one, a motor driving circuit disclosed in JP-A-05-236797 or JP-A-10-080194 can be exemplified.

FIGS. 10A and 10B are circuit diagrams showing the configuration of the motor driving circuit disclosed in JP-A-05-236797. FIG. 10A shows a first configuration example and FIG. 10B shows a second configuration example.

As shown in FIG. 10A, in the first configuration example of the motor driving circuit, a pair of FETs 41 and 42 and a backflow preventing diodes 43, which are connected in series between points A and B, a pair of FETs 44 and 45 and a backflow preventing diode 46, which are connected in series between the points A and B, a direct-current motor 47 connected between a connection point of the FETs 41 and 42 and a connection point of the FETs 44 and 45, and a current detection resistor 48 connected between the point B and a ground point constitute an H-type bridge driving circuit. Further, in the H-type bridge driving circuit, a power supply 49 is connected between the point A and the ground point, and reflux diodes 50 and 51 are correspondingly connected between both ends of the direct-current motor 47 and the ground point. In addition, a constant current control circuit 52 that controls and drives the pair of FETS 41 and 42 are provided. In this case, from the nature of the element, the FETs 41 and 42 have parasitic diodes 41(1) and 42(1) therein, respectively. Similarly, the FETs 44 and 45 have parasitic diodes 44(1) and 45(1), respectively.

The motor driving circuit according to the first configuration example operates as follows.

At the time of forward rotation of the direct-current motor 47, a high-level driving signal is supplied to the FET 41 and the FET 45, and a low-level driving signal is supplied to the FET 44 and the FET 42, such that the FETS 41 and 45 are turned on and the FETs 44 and 42 are turned off. And then, a current flows from the FET 41 to the FET 45 through the direct-current motor 47, and this current serves as a forward rotation current of the direct-current motor 47. On the other hand, at the time of reverse rotation of the direct-current motor 47, the high-level driving signal is supplied to the FET 44 and the FET 42, and the low-level driving signal is supplied to the FET 41 and the FET 45, such that the FETs 44 and 42 are turned on and the FETs 41 and 45 are turned off. And then, a current flows from the FET 44 to the FET 42 through the direct-current motor 47, and this current serves as a reverse rotation current of the direct-current motor 47.

At the time of forward rotation or reverse rotation of the direct-current motor 47, if a PWM signal is supplied from the constant current control circuit 52 as a driving signal, an average current value of the forward rotation current of the direct-current motor 47 flowing in the FET 41 or an average current value of the reverse rotation current of the direct-current motor 47 flowing in the FET 44 is changed corresponding to a pulse duty indicating an on-to-off ratio of the PWM signal. These average current values are detected by the current detection resistor 48, and the detection result is supplied to the constant current control circuit 52. At this time, the constant current control circuit 52 controls and adjusts the pulse duty of the PWM signal such that the detected average current value becomes a target current value.

The motor driving circuit according to the first configuration example uses the FETS 41, 42, 44, and 45 with the parasitic diodes formed therein as the switching elements. Accordingly, when the FETS 42 and 45 disposed close to the ground point are turned off, in order to prevent a flux current from flowing through the parasitic diodes 42(1) and 45(1), the backflow preventing diodes 43 and 46 are additionally connected in series to the FETs 42 and 45, respectively.

In contrast, as shown in FIG. 10B, in the second configuration example of the motor driving circuit, instead of the FETs 42 and 45 disposed close to the ground point from the FETs 41, 42, 44, and 45 in the first configuration example, Darlington bipolar transistors 42' and 45', in which parasitic diodes are not formed, are used. That is, the backflow preventing diodes 43 and 46, which were used in the first configuration example, are eliminated. Moreover, in FIG. 10B, the same parts as those shown in FIG. 10A are represented by the same reference numerals.

The operation of the second configuration example of the motor driving circuit is primarily the almost same as the operation of the above-described first configuration example, and the description thereof will be omitted. In this case, the motor driving circuit according to the second configuration example does not use the backflow preventing diodes 43 and 46, thereby reducing the number of circuit components to be used by that amount.

Further, FIG. 11 is a circuit diagram showing the configuration of the motor driving circuit disclosed in JP-A-10-080194 (corresponding U.S. Pat. No. 6,066,930).

As shown in FIG. 11, in the motor driving circuit, a pair of complementary transistors 61 and 63 connected between points A and B in series, a pair of complementary transistors 62 and 64 connected between the points A and B in series, a motor 65 connected between a connection point of the transistors 61 and 63 and a connection point of the transistors 62 and 64, and a current detection resistor 66 connected between the point B and a ground point constitute an H-type bridge driving circuit. Further, in the H-type bridge driving circuit, a power supply 67 is connected to the point A and the ground point, reflux diodes 68 and 69 are connected in parallel with the transistors 61 and 62, respectively, and reflux diodes 70 and 71 are correspondingly connected between both ends of the motor 65 and the ground point. In addition, a control circuit 72 that controls and drives the four transistors 61 to 64 is provided, and a comparator 74 that compares the detection voltage of the current detection resistor 66 with a reference voltage of a direct-current power supply 73 and supplies the comparison output to the control circuit 72.

The motor driving circuit having the above-described configuration operates as follows.

At the time of forward rotation of the motor 65, a driving signal having a polarity for turning on the transistor 61 and a signal having a polarity for turning on the transistor 64, and a driving signal having a polarity for turning off the transistor 62 and a signal having a polarity for turning off the transistor 63 are supplied from the control circuit 72, such that the transistors 61 and 64 are turned on and the transistors 62 and 63 are turned off. And then, a current flows from the transistor 61 to the transistor 64 through the motor 65, and this current serves as a forward rotation current. On the other hand, at the time of reverse rotation of the motor 65, a driving signal having a polarity for turning on the transistor 62 and a signal having a polarity for turning on the transistor 63, and a driving signal having a polarity for turning off the transistor 61 and a signal having a polarity for turning off the transistor 64 are supplied from the control circuit 72, such that the transistors 61 and 64 are turned on and the transistors 62 and 63 are turned off. And then, a current flows from the transistor 62 to the transistor 63 through the motor 65, and this current serves as a reverse rotation current.

At the time of forward rotation or reverse rotation of the motor 65, the current of the motor 65 is detected by the current detection resistor 66, and a detection voltage obtained from the current detection resistor 66 is supplied to the comparator 74, and the comparator 74 compares the detection voltage with a reference voltage to be output from the power supply 73. And then, when the detection voltage is larger than the reference voltage, the comparator 74 inverts a polarity of its output voltage, and the output voltage having an inverted polarity is supplied to the control circuit 72, such that forward rotation or reverse rotation driving of the motor 65 stops. As regards the stop of driving of the motor 65 at this time, two transistors, which were just immediately turned on, may be simultaneously turned off, or one of the two transistors may be turned off. Next, when predetermined time lapses, the control circuit 72 restarts forward rotation or reverse rotation of the motor 65, and then the current of the motor 65 is sequentially increased. At this time, the increased current of the motor 65 is detected by the current detection resistor 66. Subsequently, the above-described operation is repeatedly executed. Accordingly, the average current value of the current flowing in the motor 65 is made almost constant.

In addition, as an operation input apparatus in which such a motor driving circuit is used thereby to form an input apparatus with an operation feeling imparting function, for example, an operation input apparatus disclosed in JP-A-2003-22159 (corresponding U.S. Pat. No. 6,854,352) is exemplified. The operation input apparatus disclosed in JP-A-2003-22159 uses two motor driving circuits for one tiltable operating member, and thus, when the tiltable operating member operates, an operation feeling is imparted to the operating member through the motors of the two motor driving circuits. Therefore, the operation input apparatus has two driving bodies that are disposed to cross to the tiltable operating member at right angles, and two driving levers that are connected to the two driving bodies, respectively, and perform a seesaw operation in response to a tilt operation of the tiltable operating member. In this case, the shafts of the motors are combined with the two driving levers, respectively, such that the motors individually operate corresponding to the tilt operation of the tiltable operating member.

In the first configuration example, the motor driving circuit disclosed in JP-A-05-236797 uses the four FETs as the switching elements that control driving and stop of the motor, and the two backflow preventing diodes for preventing the reflux current are connected in series to the two FETs connected to the ground, respectively. Accordingly, the number of circuit components to be used is increased by that amount, and manufacturing costs tend to be increased. Further, in the second configuration example, instead of the two FETs connected to the ground, the two Darlington bipolar transistors are used, thereby avoiding the connection of the two backflow preventing diodes. However, a loss when the Darlington bipolar transistor is turned on is larger than a loss when the FET is turned on, and thus switching operation efficiency is slightly decreased.

Further, in the motor driving circuit disclosed in JP-A-10-080194, the four bipolar transistors are used as the switching elements that control driving and stop of the motor. In this case, if the value of the current flowing in the motor exceeds a predetermined value, after predetermined time lapses from that time, the two bipolar transistors are turned on. Accordingly, the time, at which the two bipolar transistors are turned on, depends on an increase rate of the value of the current flowing in the motor, and the timing at which the transistor is turned on is not made by a constant interval. Therefore, when the two bipolar transistors are turned on or off, a jarring noise may occur.

In addition, in the input apparatus with an operation feeling imparting function disclosed in JP-A-2003-22159, the driving timings of the two motors are not considered. Accordingly, when driving time of the two motors overlap, a large current temporarily flows in the two motors from the power supply, and thus ripple components of the power supply current may be increased. Further, the capacity of the power supply needs to be increased.

SUMMARY OF THE INVENTION

The invention has been finalized in view of the technical background, and it is an object of the invention to provide a motor driving control device which can use an FET serving as an element having a small loss and can reduce a jarring noise.

It is another object of the invention to provide a motor driving control device which can suppress ripple components of a power supply current, without temporarily increasing the value of a total current, when a joystick operating shaft is driven by a motor, that is, when two or more motors are driven by use of the motor driving control device.

In order to achieve the above-described objects, according to an aspect of the invention, a motor driving control device includes a motor, a switch unit that controls on/off of an one-directional current flowing in a motor, a current detecting unit that is connected in series to the motor so as to detect the value of the current of the motor and to output the detection voltage, and a control unit that incorporates a signal generating unit for generating an on signal having a polarity change portion formed at an interval of predetermined time and a holding circuit for holding a circuit state. When the arrival of the polarity change portion of the on signal is detected, the holding circuit holds the circuit state such that the switch unit is turned on and the current is supplied to the motor. Further, through the detection of the current detecting unit, when it is detected that the current of the motor is increased up to a target current value, the holding circuit releases the held circuit state such that the switch unit is turned off.

Further, the switch unit may have two first switch units and two second switch units that are brought into bridge connection so as to control on/off the one-directional current or a reverse current selectively flowing in the motor.

Further, the control unit may have a comparing unit that compares a current detection signal detected by the current detecting unit with a target value signal to be input from the outside, when the current detection signal does not reach the target value signal, becomes an open output state, and, when the current detection signal exceeds the target value signal, generates a low-level output. The on signal may be supplied to the holding circuit, together with the output of the comparing unit. The holding circuit may hold the circuit state when the on signal is supplied, and may release the held circuit state when the low-level output is supplied.

Further, the switch unit may have MOSFETs.

Further, in order to achieve the above-described objects, according to another aspect of the invention, a motor driving control device includes a motor, a switch unit that is connected between the motor and a power supply so as to control on/off a current of the motor, a current setting unit that sequentially increases the current of the motor from a current value of the motor at the time of being turned on up to a target value in order to set driving force of the motor to a predetermined value, a motor driving unit that has a current detecting unit for detecting the current value of the motor, a signal generating unit that generates a cycle signal having a first polarity change portion and a second polarity change portion alternately presenting for every interval of predetermined time, and a motor driving control mechanism that has a control unit for turning on the switch unit when the first polarity change portion of the cycle signal arrives and for turning off the switch unit at an earlier time from a time when the second polarity change portion of the cycle signal arrives and a time when the current of the motor is increased up to the target value.

Further, the motor driving control device according to another aspect of the invention may further include a second motor, a second switch unit that is connected between the second motor and the power supply so as to control on/off a current of the second motor, a second current setting unit that sequentially increases the current of the second motor from a current value of the second motor at the time of being turned on up to a target value in order to set driving force of the second motor to a predetermined value, and a second motor driving unit that has a second current detecting unit for detecting the current value of the second motor. The control unit of the motor driving control mechanism performs control such that the second switch unit is turned on when the second polarity change portion of the cycle signal arrives, and the second switch unit is turned off at the earlier time from a time when the second polarity change portion of the cycle signal arrives and a time when the current of the second motor is increased up to the target value.

Further, in the cycle signal, a time from the time of the arrival of the first polarity change portion to the time of the arrival of the second polarity change portion immediately after that may be the same as a time from the time of the arrival of the second polarity change portion to the time of the arrival of the first polarity change portion immediately after that.

DESCRIPTION OF THE PREFERRED EMBODIMENTS

Hereinafter, embodiments of the invention will be described with reference to the drawings.

Figure 1:
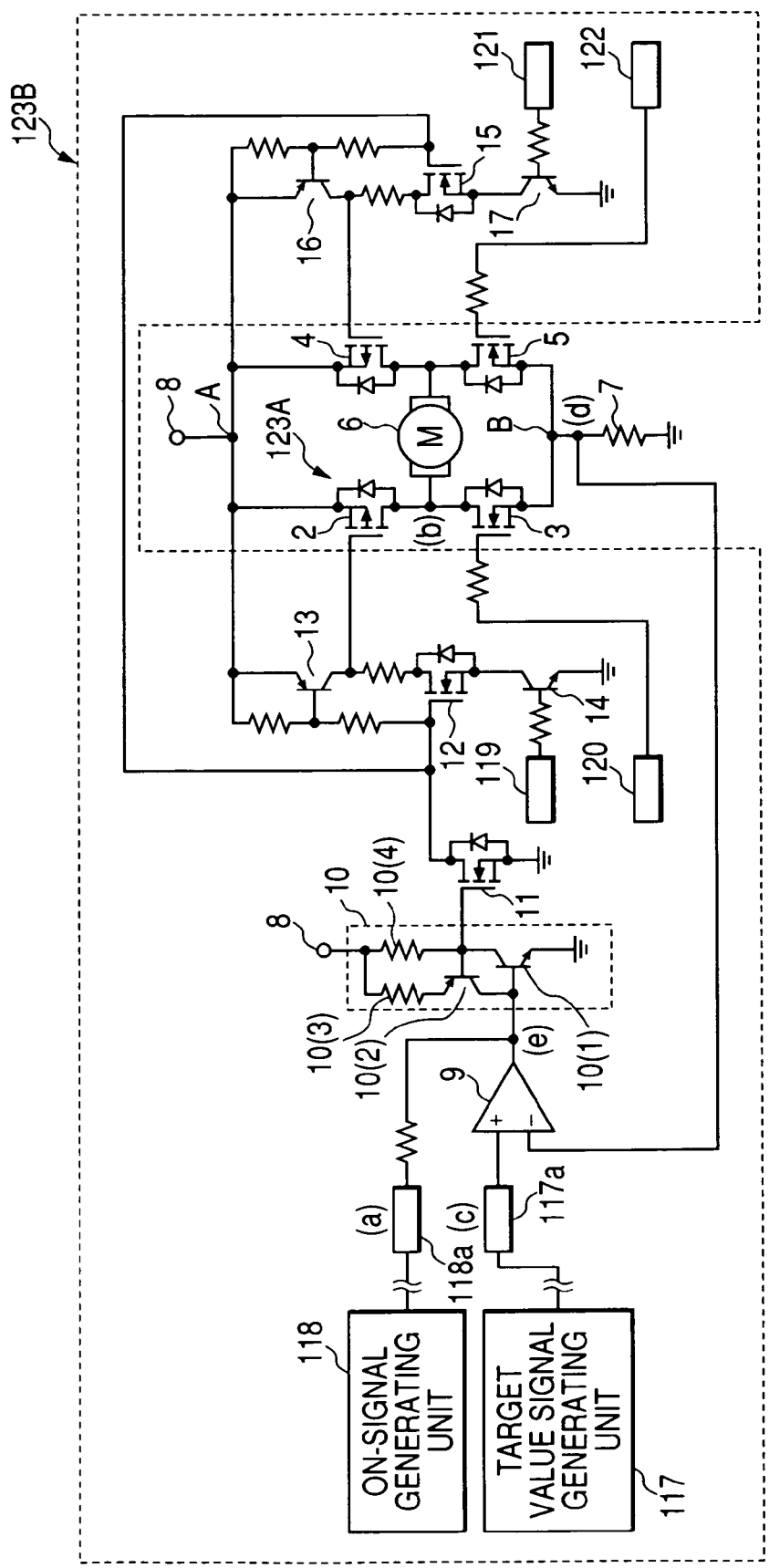
FIG. 1 is a circuit diagram showing a configuration of essential parts in a first embodiment of a motor driving control device according to the invention.

FIG. 1 is a circuit diagram showing the configuration of essential parts in a first embodiment of a motor driving control device according to the invention.

As shown in FIG. 1, the motor driving control device according to the first embodiment uses a MOSFET as a switching element. The motor driving control device has a first pair of MOSFETs 2 and 3 that are connected in series between points A and B, a second pair of MOSFETs 4 and 5 that are connected in series between the points A and B, a direct-current motor 6 that is connected between a connection point of the first pair of MOSFETs 2 and 3 and a connection point of the second pair of MOSFETs 4 and 5, a current detection resistor 7 that is connected between the point B and a ground, and a power supply terminal 8 that is connected to the point A. These elements form an H-type bridge circuit. Besides, the motor driving control device according to the first embodiment has a comparator 9 having two input terminals and one output terminal, a holding circuit 10 that has two transistors 10(1) and 10(2) to be brought into cross connection and two resistors 10(3) and 10(4), a MOSFET 11 for common driving, a MOSFET 12 and transistors 13 and 14 that drive the MOSFET 2, a MOSFET 15 and transistors 16 and 17 that drive the MOSFET 4, a target value indicating signal input terminal 117a that is connected to a target value signal generator 117, an on signal input terminal 118a that is connected to an on signal generator 118, a first logical signal input terminal 119, a second logical signal input terminal 120, a third logical signal input terminal 121, and a fourth logical signal input terminal 122.

In this case, the circuit constituents including the MOSFET 2, the MOSFET 3, the MOSFET 4, and the MOSFET 5 forms a switch unit 123A, and the circuit constituents including the comparator 9, the holding circuit 10, a target value signal generator 117, and the on signal generator 118 form a control unit 123B.

The target value indicating signal input terminal 117a is supplied with a current target value output from the target value signal generator 117, and the on signal input terminal 118a is supplied with an on signal output from the on signal generator 118. The current target value represents a current target value of the direct-current motor 6, and thus, if the current value of the direct-current motor 6 sequentially increases and reaches the current target value, the MOSFETs 2 and 5 or the MOSFETs 3 and 4 under on driving are controlled to be turned off. That is, the current target value is an upper limit value of the current value of the direct-current motor 6. The on signal is a signal having a polarity change portion in which its signal level is temporarily increased for each interval of predetermined time. If the polarity change portion of the on signal arrives at the on signal input terminal 118a, the holding circuit 10 latches and holds a circuit state in which a predetermined current flows in the two transistors 10(1) and 10(2). During the period in which the circuit state is latched and held, the on state of the MOSFET 2 or the MOSFET 4 is held. Accordingly, if the on state of the MOSFET 2 or the MOSFET 4 is held, the current value of the direct-current motor 6 is sequentially increased. Further, the first to fourth logical signal input terminals 119 to 123 are supplied with first to fourth logical signals, respectively, so as to selectively turn on or off the FETs 2 to 5.

Figure 2:
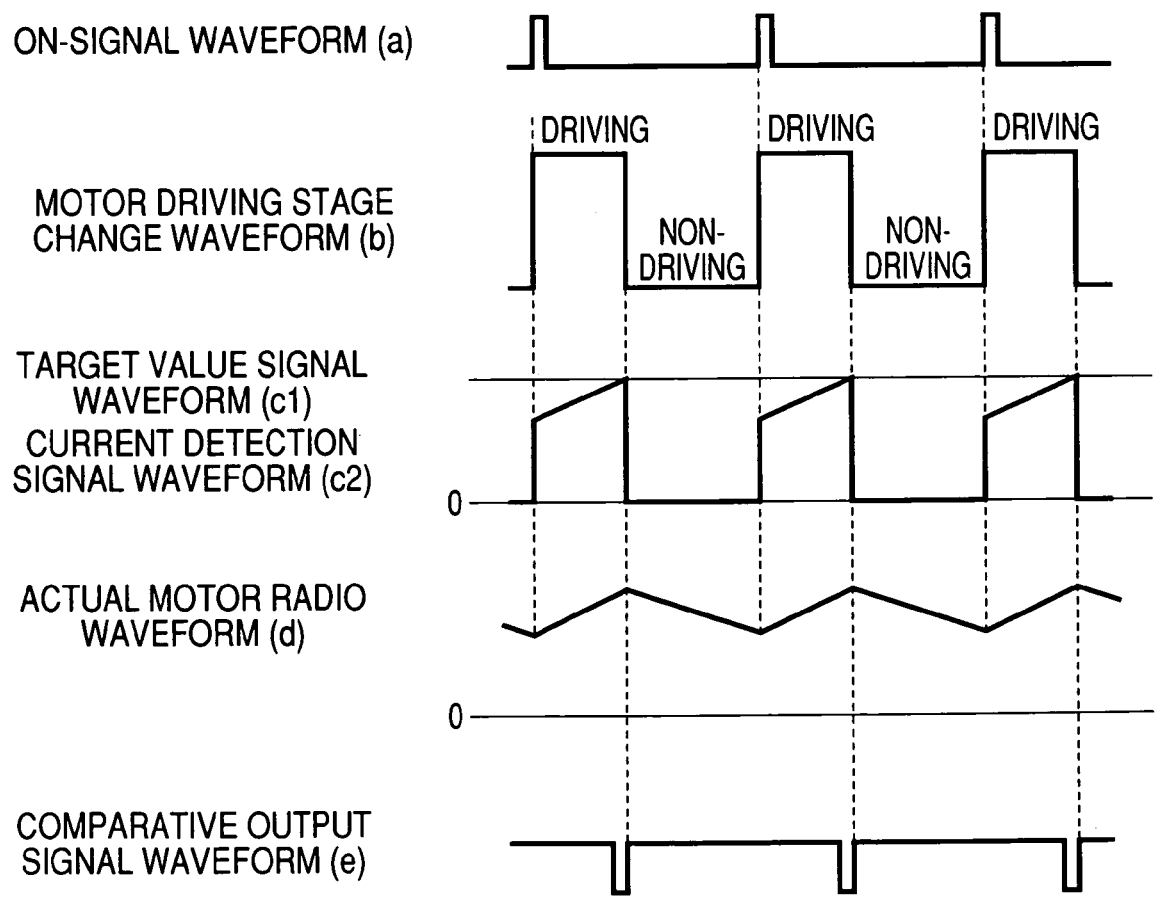
FIG. 2 is a characteristic diagram showing an example of a voltage or current waveform state supplied to each part of the motor driving control device shown in FIG. 1.

Next, FIG. 2 is a characteristic diagram showing an example of a voltage or current waveform state supplied to each part of the motor driving control device shown in FIG. 1.

In FIG. 2, a first-stage (highest) waveform (a) is a signal waveform of the on signal to be supplied to the on signal input terminal 118a, a second-stage waveform (b) is a motor driving state change waveform indicating a driving/non-driving state of the direct-current motor 6, third-stage waveforms (c1) and (c2) are a current target value waveform to be supplied to the target value signal input terminal 117a and a current detection signal waveform to be detected by the current detection resistor 7, a fourth-stage waveform (d) is a waveform of a current flowing in the direct-current motor 6, and a fifth-stage (lowest) waveform (e) is a waveform of a comparison output signal output from the comparator 9.

In this case, the signal waveform (a) of the on signal is normally in a low signal level but has a polarity change portion in which the low level is temporarily increased to a high level for each interval of predetermined time. The time interval in which the polarity change portion is supplied is made constant. The motor driving state change waveform (b) is changed to be driven at the time of the arrival of the polarity change portion of the on signal and to be non-driven at the time of the arrival of a polarity change portion of an off signal to be described below of the comparator 9. The current target value waveform (c1) has a constant level as a current target value, and the current detection-signal waveform (c2) is changed to be sequentially increased from any level when the direct-current motor 6 is driven and to be in a zero level since the direct-current motor 6 is not-driven at the time of being increased up to the current target value. The actual motor current waveform (d) is sequentially increased in a linear shape when the direct-current motor 6 is driven, and is sequentially decreased in a linear shape when the direct-current motor 6 is non-driven. Further, the comparison output signal waveform (e) is normally in a high signal level but has a polarity change portion in which the high level is temporarily changed to the low level when the current detection signal reaches the current target value. The time interval in which the polarity change portion is supplied is not necessarily made constant.

The operation of the motor driving control device according to the first embodiment having the above-described configuration will be described below with reference to the characteristic diagram shown in FIG. 2.

When a motor driving circuit in this embodiment is used for driving a motor in the input apparatus with an operation feeling imparting function of the related art, if the operating member, such as the operating lever of the input apparatus, is operated according to a position or a speed of the operating lever, or a position of a cursor on a display to be operated by the operating lever, a prescribed large torque is applied to the operating member. Now, a case in which the direct-current motor 6 is rotated from the stop state in one direction (forward direction) with a predetermined torque and a prescribed torque is applied to the operating member will be described. In this case, the target value signal having a size corresponding to a predetermined torque value is supplied to the target value signal input terminal 117a. Further, at the time of forward rotation, a positive logical signal is supplied to the first logical signal input terminal 119 and the fourth logical signal input terminal 122, and a negative logical signal is supplied to the second logical signal input terminal 120 and the third logical signal input terminal 121. Moreover, at the time of reverse rotation, the polarities of the logical signals to be input are inverted.

If the target value signal to be output from the target value signal generator 117 is supplied to the target value signal input terminal 117a, the target value signal is supplied to a non-inverted input terminal (+) of the comparator 9. At that time, the detection voltage value to be supplied from the current detection resistor 7 is lower than the target value signal, and the detection voltage value is supplied to an inverted input terminal (−) of the comparator 9, such that the comparator 9 is in an open output state. At this time, if the on signal output from the on signal generator 118 is supplied to the on signal input terminal 118a at an interval of predetermined time, an input of the holding circuit 10 is in a high level, and a circuit state of the holding circuit 10 is latched and held and its output terminal is almost a ground potential, such that the MOSFET 11 for common driving is turned off, the next MOSFET 12 is turned on, and the transistor 13 is turned off. At this time, as described above, since the first logical signal input terminal 119 is supplied to the positive logical signal, the transistor 14 is turned on, and the MOSFET 2 is also turned on. Simultaneously, the positive logical signal, which is supplied to the fourth logical signal input terminal 122, is supplied to a gate of the MOSFET 5, and the MOSFET 5 is also turned on.

On the other hand, since the second logical signal input terminal 120 and the third logical signal input terminal 121 are supplied with the negative logical signal, the transistor 17 supplied with the negative logical signal, and the MOSFET 15 and the transistor 16 connected in series to the transistor 17 are turned off. If the MOSFET 15 and the transistors 16 and 17 are turned off, the MOSFET 14 is turned off. Simultaneously, the negative logical signal is supplied to a gate of the MOSFET 3, and the MOSFET 3 is also turned off.

At this state, a forward current, which reaches a ground point from the power supply terminal 8 through the MOSFET 2, the direct-current motor 6, the MOSFET 5, and the current detection resistor 7, flows, and thus the direct-current motor 6 rotates in a forward direction. Further, as shown in FIG. 2, the motor driving state change waveform (b) is in a driving state, and the actual motor current waveform (d) is sequentially increased in a linear shape. And then, if the forward current flows in the current detection resistor 7, the current detection signal is generated at a non-ground terminal of the current detection resistor 7, that is, at the point B, and the current detection signal is supplied to an inverted input terminal (−) of the comparator 9.

The comparator 9 is supplied with the target value signal from the target value signal input terminal 117a through the non-inverted input terminal (+), and the current detection signal through the inverted input terminal (−), and compares the target value signal with the current detection signal. At the time of the voltage comparison, as shown in FIG. 2, the current detection signal waveform (c2) is smaller than the target value signal waveform (c1), the comparison output signal waveform (e) of the comparator 9 is maintained in the open state, and the circuit state of the holding circuit 10 is latched and held. Further, the MOSFET 2 is maintained in the on state, together with the MOSFET 5, and thus the direct-current motor 6 continues to rotate in one direction.

Subsequently, as shown in FIG. 2, if the current detection signal waveform (c2) to be supplied to the comparator 9 is sequentially increased and reaches the target value signal waveform (c1) or slightly exceeds the target value signal waveform (c1), the comparison output signal waveform (e) of the comparator 9 has the polarity change portion where the open state is changed to the low level state. If the low-level polarity change portion is supplied to the holding circuit 10, in the holding circuit 10, the two transistors 10(1) and 10(2) are turned off, the latched and held circuit state is released, and its output terminal is almost a power supply voltage. And then, the MOSFET 11 for common driving is turned on, the next MOSFET 12 is turned off, and the transistor 13 is turned on. Accordingly, the MOSFET 2 is turned off, and driving of the direct-current motor 6 stops, such that the current flowing in the direct-current motor 6 is just a regenerative current. Moreover, the regenerative current flows in a passage having the direct-current motor 6, and parasitic diodes of the MOSFET 5 and the MOSFET 3. In this case, in the comparator 9, the current detection signal waveform (c2) returns to a state lower than the target value signal waveform (c1) in a short time from the time when the current detection signal waveform (c2) reaches the target value signal waveform (c1), and thus the low-level polarity change portion returns to the open state in a short time from the time when the low-level polarity change portion is generated in the comparison output signal waveform (e). And then, even when the comparison output signal waveform (e) returns to the open state, in the holding circuit 10, the off states of the transistors 10(1) and 10(2) are continued, the MOSFET 2 continues to be turned off, and thus the driving stop state of the direct-current motor 6 is continued.

In this state, if the next polarity change portion of the on signal waveform (a) arrives, the above-described operation is repeatedly executed. As such, as long as the polarity change portion of the on signal does not arrive, the direct-current motor 6 is driven, and, when the polarity change portion of the off signal by the comparator 9 arrives, the direct-current motor 6 is non-driven. And then, as shown in FIG. 2, since a current, which is changed in a shape of the actual motor current waveform (d), flows in the direct-current motor 6, the value of the current flowing in the direct-current motor 6 is almost constant. In this case, since the obtained current value depends on the size of the target value signal, when the target value signal is made large, the time interval between the time when the polarity change portion of the on signal arrives and the time when the polarity change portion of the off signal to be output from the comparator 9 arrives is made long, and thus the current becomes large. On the other hand, when the target value signal is made small, the time interval between the time when the polarity change portion of the on signal arrives and the time when the polarity change portion of the off signal to be output from the comparator 9 is made short, and thus the current value becomes small.

As such, according to the motor driving control device of the first embodiment, the on signal having the polarity change portion presenting for each interval of predetermined time is used, and the direct-current motor 6 is driven when the polarity change portion of the on signal arrives. Further, according to the polarity change portion of the off signal to be formed when the value of the current flowing in the direct-current motor 6 reaches the target current value, the direct-current motor 6 is non-driven. Therefore, the value of the current flowing in the direct-current motor 6 can be controlled to the value depending on the target current value. And then, in this case, the timing at which the MOSFET 2 or the MOSFET 4 is turned on is at the interval of predetermined time, and thus a jarring noise does not occur. In this case, since the current flowing in the direct-current motor 6 at the time of driving of the direct-current motor 6 is detected, and the value of the regenerative current at the time of non-driving of the direct-current motor 6 is not detected, the MOSFET can be used in a switch circuit for on/off driving the direct-current motor 6. Further, since the direct-current motor 6 can have a prescribed torque range, when the operating member connected to the motor is manually operated, an operation feeling can be controlled, and thus the operation can be performed with a favorable operation feeling.

Figure 3:
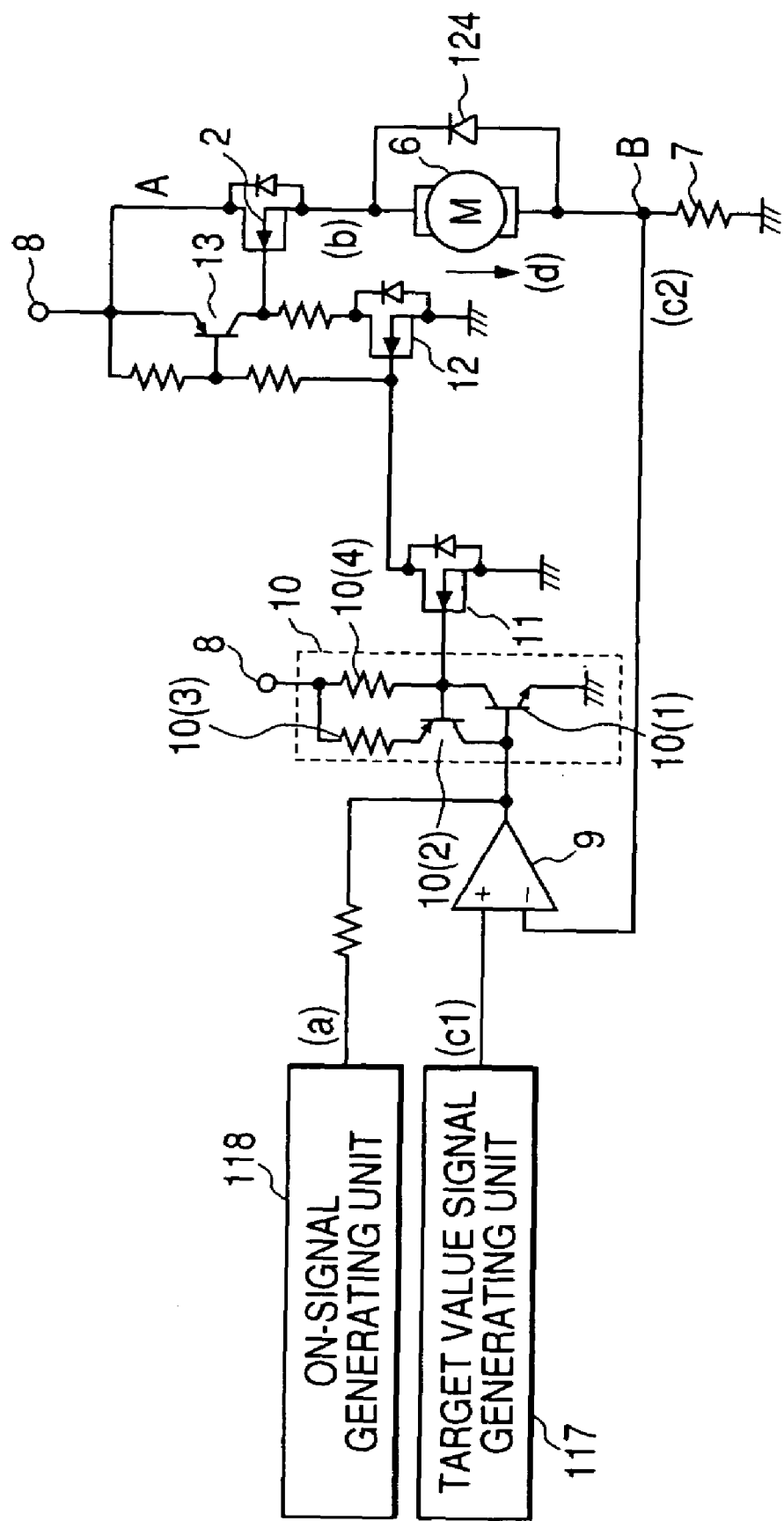
FIG. 3 is a circuit diagram showing a configuration of essential parts in a second embodiment of a motor driving control device according to the invention.

Next, FIG. 3 is a circuit diagram showing the configuration of essential parts in a second embodiment of a motor driving control device according to the invention. Moreover, in FIG. 3, the same parts as those in FIG. 1 are represented by the same reference numerals.

As shown in FIG. 3, a motor driving control device according to the second embodiment uses a MOSFET as a switching element, and has a MOSFET 2 that is connected in series between points A and B, together with a direct-current motor 6, a current detection resistor 7 that is connected between the point B and a ground, and a power supply terminal 8 that is connected to the point A. Besides, the motor driving control device according to the second embodiment has a comparator 9, a holding circuit 10 that has two transistors 10(1) and 10(2) to be brought into cross connection and two resistors 10(3) and 10(4), a MOSFET 11, a MOSFET 12 and a transistor 13 that drive the MOSFET 2, a target value signal generator 117, an on signal generator 118, and a diode 124 that forms a passage of a regenerative current.

In this case, the circuit constituents including the MOSFET 2 and the like form a switch unit. Further, the circuit constituents forming a control circuit are the same as those in the first embodiment.

In the motor driving control device according to the first embodiment, the H-type bridge circuit including the four MOSFETs, that is, the MOSFET 2 to the MOSFET 5 is used for rotation driving of the direct-current motor 6. However; when the direct-current motor 6 may constantly rotate in one direction, like the motor driving control device according to the second embodiment, one MOSFET 2 can be used.

The operation of the motor driving control device according to the second embodiment is almost the same as the operation when the direct-current motor 6 rotates in the forward direction in the motor driving control device according to the first embodiment described above, and the advantages are the same as those in the first embodiment. Therefore, the descriptions on the operation and the advantages of the motor driving control device according to the second embodiment will be omitted.

Moreover, in the first and second embodiments, the control is performed such that, when the on signal waveform is changed from the off state to the on state, the holding circuit 10 is in the latched state, and the driving current flows in the direct-current motor 6. Alternatively, by changing the circuit constituents of the holding circuit 10 or the like, the control may be performed such that, when the on signal waveform is changed from the on state to the off state, the holding circuit 10 is in the latched state, and the driving current flows in the direct-current motor 6.

Further, in the first and second embodiments, the example in which the transistors 10(1) and 10(2) are used as the elements forming the holding circuit 10 is exemplified. Alternatively, instead of the transistors 10(1) and 10(2), the MOSFETs may be used.

Figure 4:
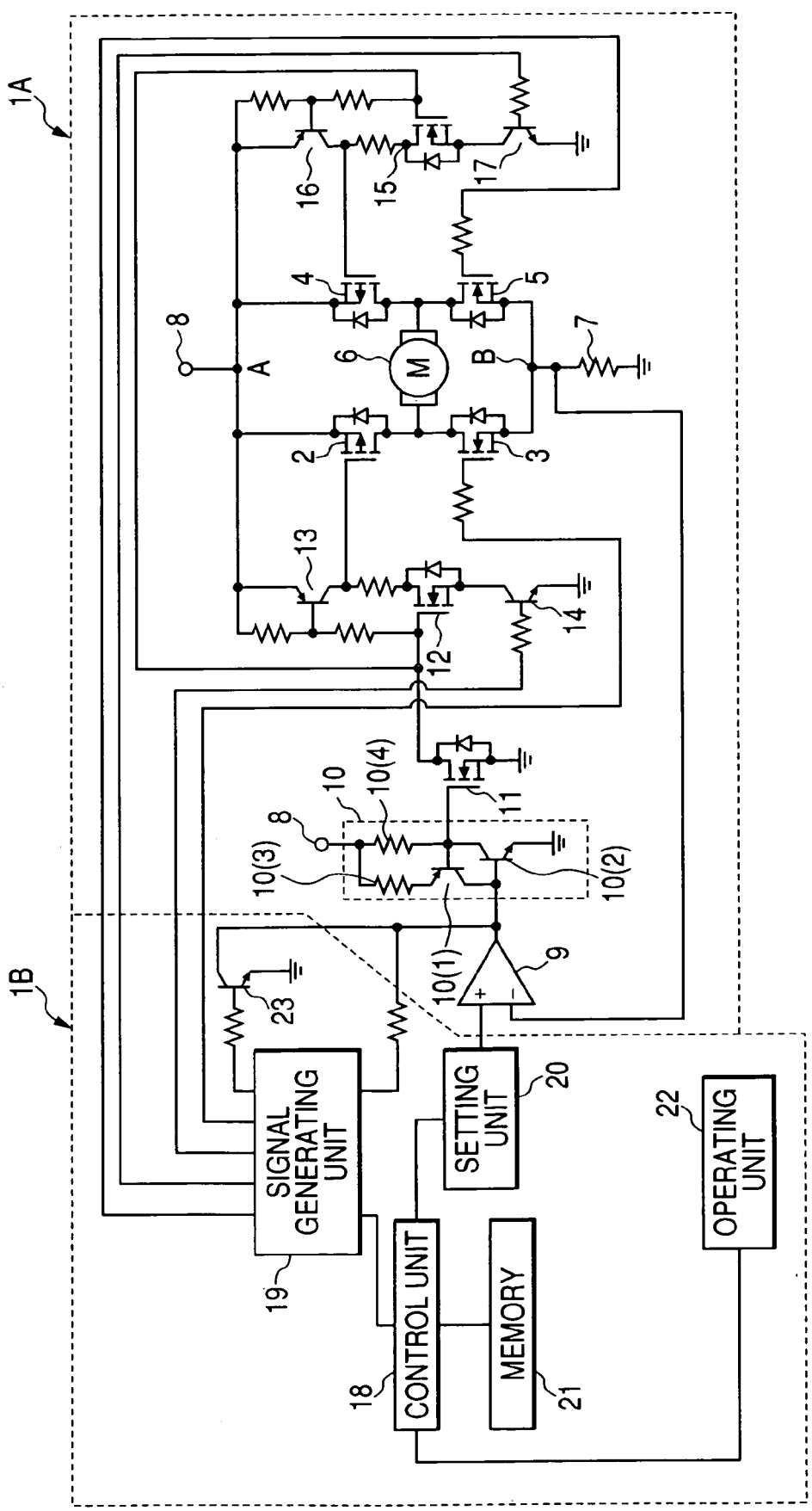
FIG. 4 is a circuit diagram showing a configuration of essential parts in a third embodiment of a motor driving control device according to the invention.

FIG. 4 is a circuit diagram showing the configuration of essential parts in a third embodiment of a motor driving control device according to the invention. The third embodiment is the improvement of the first embodiment. That is, in the motor driving control device of the first embodiment, if the target current value is set to a relatively large value, even when the polarity change portion of the next on signal arrives after the motor is driven by the arrival of the polarity change portion of the on signal, the current detection signal may not be increased up to the target current value. In this case, the motor is not changed to the non-driving state. As a result, the cycle of driving and non-driving of the motor becomes the timing at which the polarity change portion of the on signal arrives two times (three more times according to the target current value), and the cycle of driving and non-driving of the motor enters an unexpected audible frequency region, such that a noise may occur. However, in the third embodiment, this problem does not occur.

As shown in FIG. 4, the motor driving control device according to this embodiment has a motor driving unit 1A and a motor driving control mechanism 1B. And then, the motor driving unit 1A uses a MOSFET (hereinafter, referred to as FET) as a switching element. The motor driving unit 1A includes an H-type bridge circuit having a first pair of FETs 2 and 3 that are connected in series between points A and B, a second pair of FETs 4 and 5 that are connected in series between the points A and B, a direct-current motor 6 that is connected between a connection point of the first pair of FETs 2 and 3 and a connection point of the second pair of FETs 4 and 5, a current detection resistor 7 that is connected between the point B and a ground, and a power supply terminal 8 that is connected to the point A, a comparator 9 having two input terminal and one output terminal, a holding circuit 10 that has two transistors 10(1) and 10(2) to be brought into cross connection and two resistors 10(3) and 10(4), an FET 11 for common driving, an FET 12 and transistors 13 and 14 that drive the FET 2, and an FET 15 and transistors 16 and 17 that drive the FET 4.

Further, the motor driving control mechanism 1B has a control unit 18 that collectively controls the motor driving control mechanism 1B, a signal generator 19 that generates a cycle signal having an on signal and an off signal, and first to fourth logical signals, a setting unit 20 that sets and outputs a current target value, a memory 21 that stores various kinds of information, an operating unit 22, and a transistor 23 that inverts the polarity of the off signal.

Figure 5:
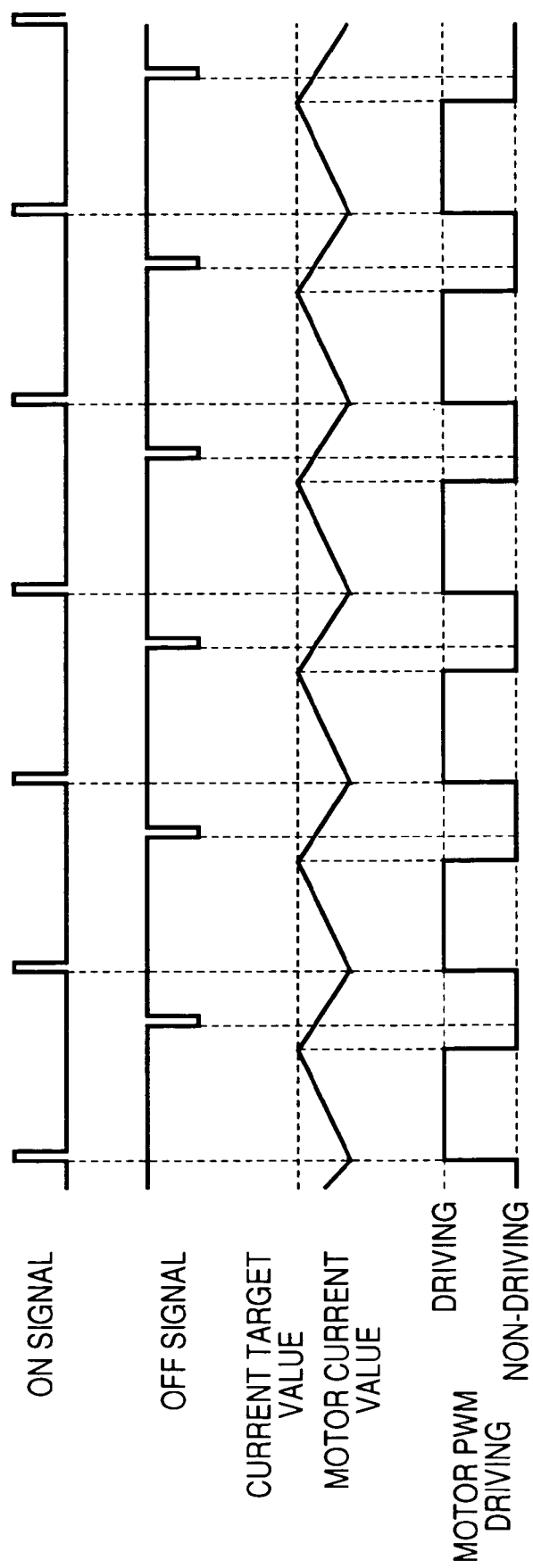
FIG. 5 is a characteristic diagram showing an example of a voltage or current waveform state supplied to each part of the motor driving control device shown in FIG. 4, which shows a first operation example when a current of a motor is increased up to a target value and when a second polarity change portion of an off signal does not come.

In this case, the setting unit 20 outputs the current target value corresponding to the current value of the direct-current motor 6, and the current target value is supplied to a non-inverted input of the comparator 9. As shown in FIG. 5, the signal generator 19 outputs the on signal having a first polarity change portion in which its signal level is temporarily increased for each interval of predetermined time, the off signal having a second polarity change portion in which its signal level is temporarily increased for each interval of predetermined time, and is converted such that its polarity is inverted by the transistor 23 and its signal level is temporarily decreased for each interval of predetermined time, and the first to fourth logical signals that selectively turns on or off the FETs 2 to 5. In this case, the on signal is directly supplied to the input of the holding circuit 10, and the off signal is supplied to the input of the holding circuit 10 after its polarity is inverted by the transistor 23. Further, the first to fourth logical signals are supplied to the transistor 14, the FET 3, the transistor 17, and the FET 5, respectively.

The comparator 9 is supplied with the current target value through the non-inverted input and the current value of the direct-current motor 6 detected by the current detection resistor 7 through the inverted input, when the current target value is lower than the current value, is in the open state, and, if the current value exceeds the current target value, generates the low-level output. In the holding circuit 10, when the high-level output is supplied to its input, the two transistors 10(1) and 10(2) are latched and held in the on state, and, when the low-level output is supplied to the input, the two transistors 10(1) and 10(2) are held in the off state. During the holding circuit 10 is latched and held in the on state, the FET 2 or the FET 4 is held in the on state. If the FET 2 or the FET 4 is held in the on state, the current value of the direct-current motor 6 is sequentially increased. In contrast, if the circuit state of the holding circuit 10 is held in the off state, the FET 2 or the FET 4 becomes the off state, and the current value of the direct-current motor 6 is sequentially decreased.

Figure 6:
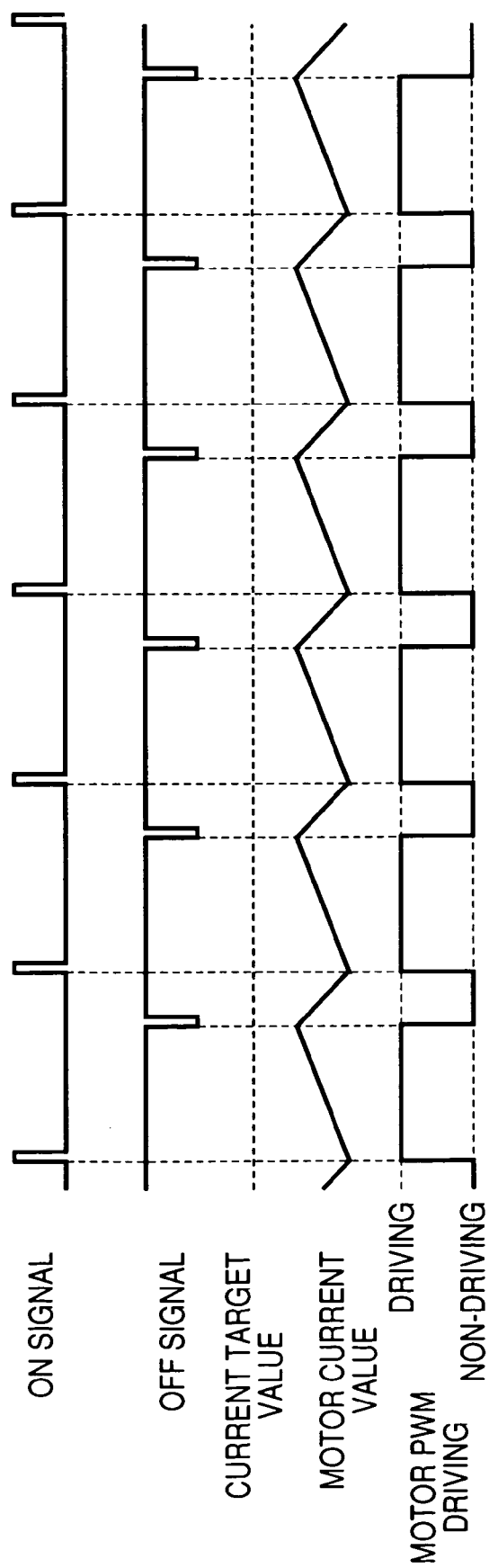
FIG. 6 is a characteristic diagram showing an example of a voltage or current waveform state supplied to each part of the motor driving control device shown in FIG. 4, which shows a first operation example before a current of a motor is increased up to a target value and when a second polarity change portion of an off signal arrives.

Here, FIGS. 5 and 6 are characteristic diagrams showing an example of a voltage or current waveform to be supplied to each part of the motor driving control device shown in FIG. 4. FIG. 5 shows a first operation example when the current of the motor is increased up to the target value and when the second polarity change portion of the off signal does not arrive. FIG. 6 shows a second operation example before the current of the motor is increased up to the target value and when the second polarity change portion of the off signal arrives.

Hereinafter, the first operation example in the motor driving control device shown in FIG. 4 will be described with reference to FIG. 5.

In this embodiment, the motor driving control device is used for driving the motor of the input apparatus with an operation feeling imparting function according to the related art. If an operating unit 22 is operated, the control unit 18 performs the control according to an operation position or a speed of the operating unit 22, or a position of a cursor on a display to be operated by the operating unit 22, such that a predetermined torque stored in the memory 21 or a torque having a predetermined relationship is set. Here, a case in which the direct-current motor 6 is rotated from the stop state in one direction (forward direction) with a predetermined torque and a prescribed torque is applied to an operating member will be described.

In this case, a signal indicating the current target value having a size corresponding to a predetermined torque value is output from the setting unit 20 by the control of the control unit 18, but, since the voltage value to be detected by the current detection resistor 7 at this time is lower than the current target value, the comparator 9 becomes the open output state. And then, with the arrival of the first polarity change portion of the on signal output from the signal generator 19, the circuit state of the holding circuit 10 is latched and held in the on state. At this time, the first logical signal and the fourth logical signal having positive logical levels are supplied from the signal generator 19 to the transistor 14 and the FET 5, such that the FET 2 and the FET 5 are in the on state. On the other hand, the second logical signal and the third logical signal having negative logical levels are supplied to the FET 3 and the transistor 17 from the signal generator 19, such that the FET 3 and the FET 4 are in the off state. And then, if the output of the holding circuit 10 is almost a ground potential, the FET 11 for common driving is turned off, and the next FET 12 is turned on, such that the transistor 13 connected to the FET 12 as a drain load is turned on. At this time, as described above, since the logical signal having the positive logical level is supplied to the transistor 14, the FET 2 is also turned on.

At this state, a forward current flows from the power supply terminal 8 through the FET 2, the motor 6, the FET 5, and the current detection resistor 7. Accordingly, the motor 6 rotates in the forward direction, and, as shown in FIG. 2, motor PWM driving is in a driving state, and the motor current is sequentially increased in a linear shape. And then, if the forward current flows in the current detection resistor 7, the current value of the motor 6 is detected, and the current value is supplied to the inverted input of the comparator 9. The comparator 9 compares the current target value input to the non-inverted input and the current value input to the inverted input. At the time of the voltage comparison, if the current value is smaller than the current target value, the comparator 9 becomes the output open state. Therefore, the circuit state of the holding circuit 10 is latched and held in the on state as it is, the FET 2 and the FET 5 continue to be in the on state, and the motor 6 continues to rotate in one direction.

If the current value to be supplied to the comparator 9 is sequentially increased and reaches the current target value or slightly exceeds the current target value, the comparator 9 is changed from the output open state to the low-level output state. At this time, with the low-level output of the comparator 9, the circuit state of the holding circuit 10 is held in the off state, the FET 11 for common driving is turned on, the next FET 12 is turned off, and the transistor 13 is turned off. Accordingly, the FET 2 is turned off, driving of the motor 6 stops, and the current flowing in the motor 6 is just the regenerative current flowing through a parasitic diode of the FET 3, the motor 6, and the FET 5, such that the motor current is sequentially decreased.

And then, the subsequent operation is the same as described above. That is, when the current value detected by the current detection resistor 7 is in a state lower than the current target value, if the first polarity change portion of the on signal from the signal generator 19 arrives, the FET 2 and the FET 5 are in the on state, and driving of the motor 6 starts. If the current value to be supplied to the comparator 9 reaches the current target value or slightly exceeds the current target value, the FET 2 is turned off, and driving of the motor 6 stops. Through such an operation, the value of the current flowing in the motor 6 is almost constant. That is, the motor in the first operation example is driven similarly to the above-described first embodiment.

Next, the second operation example in the motor driving control device shown in FIG. 4 will be described with reference to FIG. 6.

In the second operation example, a motor stop time at which the driving stop of the motor 6 is performed and the operation state at that time are different from those in the first operation example. Other operations are the same as those in the first operation example described above. For this reason, in the following description of the second operation example, only an operation having a different operation state will be described, and the descriptions of other operations will be omitted.

That is, in the first operation example, before the second polarity change portion of the off signal output from the signal generator 19 arrives, the current value to be supplied to the comparator 9 is sequentially increased in a linear shape and reaches the current target value or slightly exceeds the current target value. Further, the low-level output from the comparator 9 at this time is supplied to the holding circuit 10, and the circuit state of the holding circuit 10 is latched in the off state. Accordingly, the FET 2 is turned off, such that driving of the motor 6 stops.

In contrast, in the second operation example, before the current value to be supplied to the comparator 9 is sequentially increased in the linear shape and reaches the current target value or slightly exceeds the current target value, the second polarity change portion of the off signal output from the signal generator 19 arrives. Further, the low-level output obtained at this time is supplied to the holding circuit 10, and the latched and held circuit state of the holding circuit 10 is released. Accordingly, the FET 2 is turned off, such that driving of the motor 6 stops.

An operation difference in the first operation example and the first operation example is apparent from the change states of the off signal, the current target value, the average current value, and PWM driving of the motor in FIG. 5 showing the operation state of the first operation example and FIG. 6 showing the operation state of the second operation example.

That is, as shown in FIG. 5, in the first operation example, the operation is made such that, before the second polarity change portion of the off signal arrives, the current value reaches the current target value or the current value slightly exceeds the current target value. At this time, the motor 6 is changed from the driving state to the driving stop state, and the current value is changed from an increase tendency to a decrease tendency. In contrast, as shown in FIG. 6, in the second operation example, the operation is made such that, before the current value reaches the current target value, the second polarity change portion of the off signal arrives. At this time, the motor 6 is changed from the driving state to the driving stop state, and the current value is changed from the increase tendency to the decrease tendency.

In this case, since whether the motor driving control device operates according to the first operation example or the second operation example depends on the set current target value, the operation may be made according to the first operation example when the current target value is set to a relatively low value. On the other hand, when the current target value is set to a relatively high value, the operation may be made according to the second operation example. Further, when the current target value is set to an intermediate value between the relatively low value and the relatively high value, according to the whether the time at which the second polarity change portion of the off signal arrives is earlier or later the time at which the current value reaches the current target value or the current value slightly exceeds the current target value, the operation is made according to the second operation example or the first operation example.

Moreover, in the present embodiment, it is designed such that the operation is made according to the first operation example at the time of a normal use state. For example, however, when the current target value is set by performing an arithmetic operation so as to satisfy the predetermined relationship stored in the memory 21, the operation can be made according to the second operation example so as not to simply set a torque corresponding to the current target value, thereby avoiding the occurrence of an unexpected noise.

The descriptions of the operations in the first operation example and the second operation example relate to an operation when the forward current flows in the motor 6 and the motor 6 rotates in the forward direction. As for an operation when a reverse current flows in the motor 6 and the motor 6 rotates in a reverse direction, just the elements to be turned on or turned off are different, and the operation is primarily the same as the operation described above. That is, in the operation when the motor 6 rotates in the forward direction, the control is performed such that the FET 2 and the FET 5 are turned on, and the FET 3 and the FET 4 are turned off. In contrast, in the operation when the motor 6 rotates in the reverse direction, the positive/negative polarities of the logical signals are inverted, that is, the control is performed such that the FET 3 and the FET 4 are turned on, and the FET 2 and the FET 5 are turned off.

As such, according to the motor driving control device according to the third embodiment, the motor 6 is driven when the first polarity change portion of the on signal to be supplied for each interval of predetermined time, and driving of the motor 6 stops at the earlier time from the time when the second polarity change portion of the off signal to be supplied for each interval of predetermined time and the time the average current value of the motor 6 reaches the target current value. Therefore, the average current value of the motor 6 can be maintained at the predetermined value, without making the change cycle of driving and non-driving of the motor 6 longer than the arrival interval of the first polarity change portion of the on signal. Further, the regenerative current of the motor 6 does not need to be accurately detected, and an unnecessary noise occurring at the time of the operation can be reduced.

Figure 7:
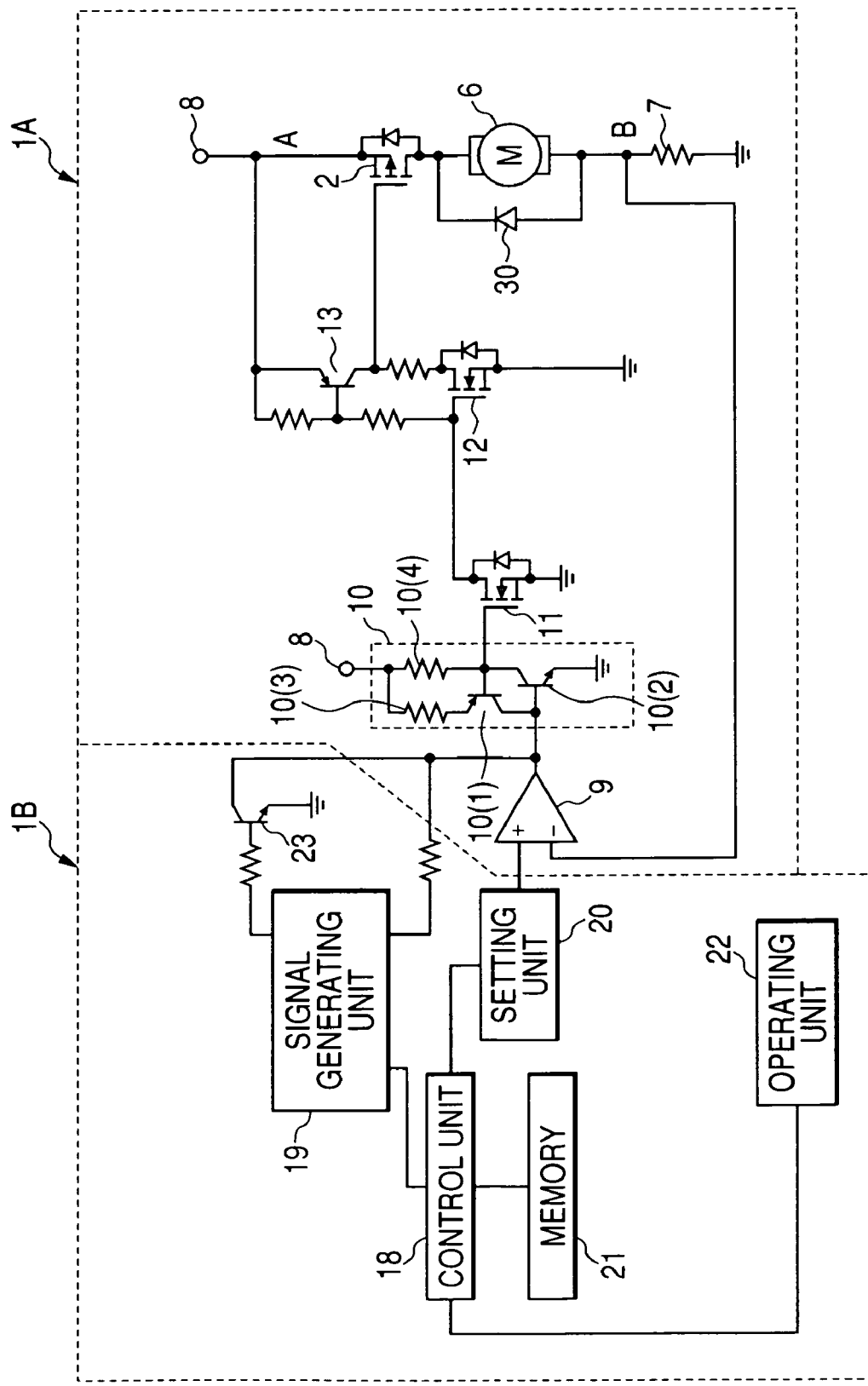
FIG. 7 is a circuit diagram showing a configuration of essential parts in a fourth embodiment of a motor driving control device according to the invention.

Next, FIG. 7 is a circuit diagram showing the configuration of essential parts in a fourth embodiment of a motor driving control device according to the invention.

As shown in FIG. 7, the motor driving control device according to the fourth embodiment constantly rotates the motor 6 in the forward direction, and thus, instead of the H-type bridge circuit having the four FETs 2 to 5 used in the motor driving unit 1A of the motor driving control device according to the third embodiment, a circuit having an FET 2, which is connected in series to the direct-current motor 6, is used.

As shown in FIG. 7, similarly, the motor driving control device according to the fourth embodiment includes a motor driving unit 1A and a motor diving control mechanism 1B. The motor driving unit 1A includes a circuit, in which an FET 2 and a direct-current motor 6 are connected in series between points A and B, and a current detection resistor 7 is connected between the point B and a ground, a diode 30 that is connected in parallel with the direct-current motor 6, a comparator 9 having two input terminals and one output terminal, a holding circuit 10 that has two transistors 10(1) and 10(2) to be brought into cross connection and two resistors 10(3) and 10(4), an FET 11 for common driving, and an FET 12 and a transistor 13 that drive the FET 2. Further, the motor driving control mechanism 1B has the same configuration as that of the motor driving control mechanism 1B according to the third embodiment. Moreover, in FIG. 7, the same parts as those shown in FIG. 4 are represented by the same reference numerals.

The operation of the motor driving control device according to the fourth embodiment having the above-described configuration is the same as the operation in the motor driving control device according to the third embodiment when the forward current flows in the motor 6 and the motor 6 rotates in the forward direction. And then, the operation in the motor driving control device according to the third embodiment has been described already, and thus the description of the operation of the motor driving control device according to the fourth embodiment will be omitted. Further, the advantages to be obtained in the motor driving control device according to the fourth embodiment are the same as those to be obtained in the motor driving control device according to the third embodiment described above since the operation is the same as that of the motor driving control device according to the third embodiment, and thus the descriptions thereof will be omitted.

Figure 8:
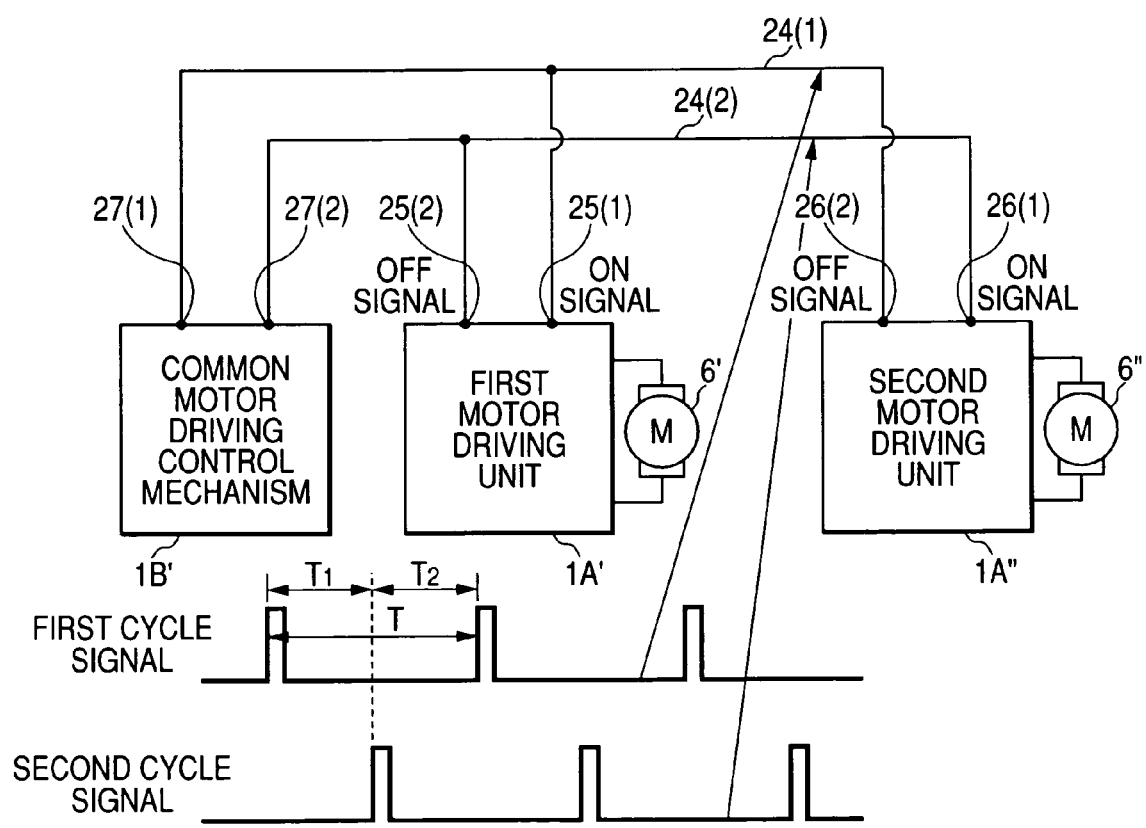
FIG. 8 is a block diagram showing a configuration of main parts in a fifth embodiment of a motor driving control device according to the invention.
Figure 9:
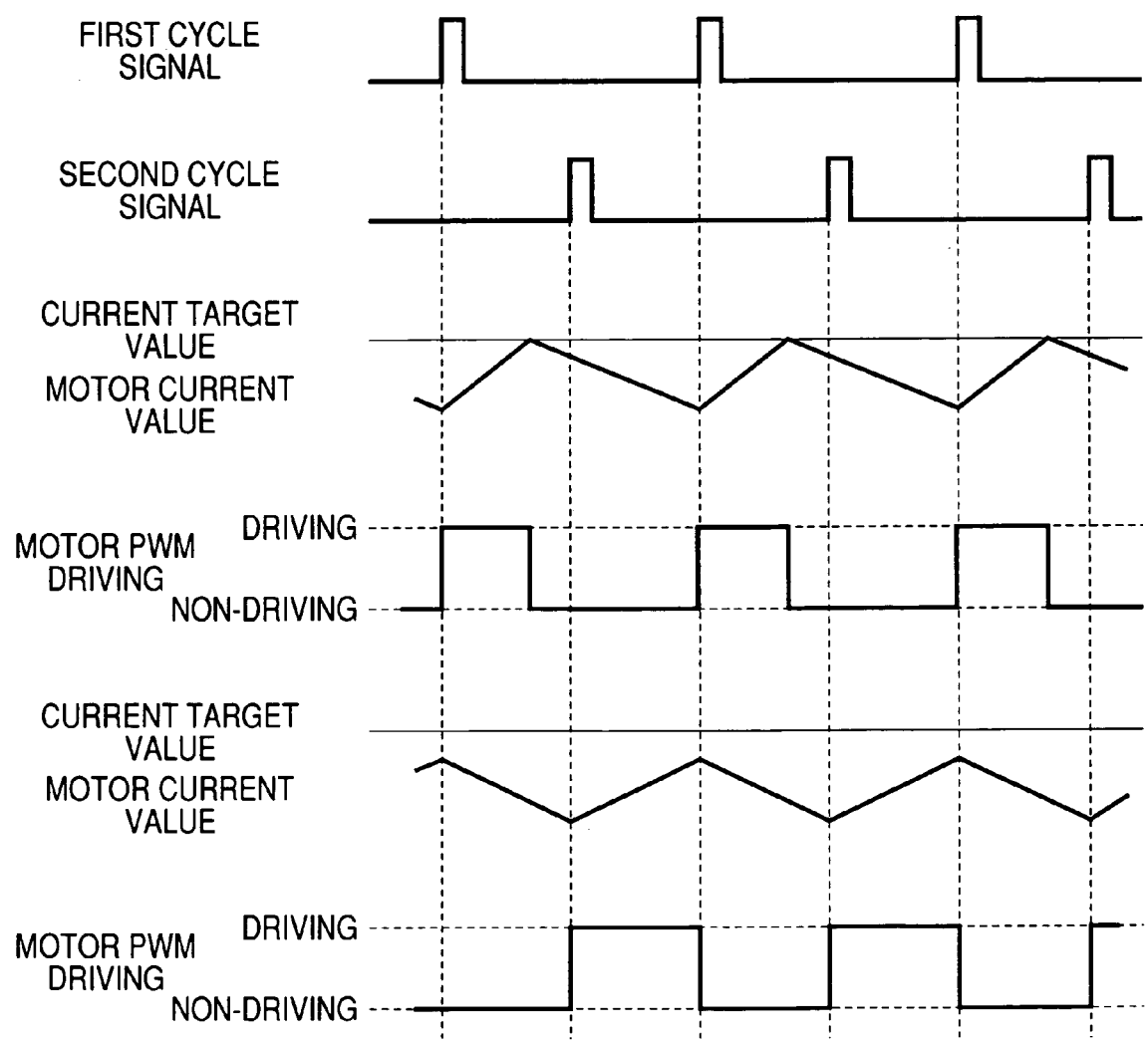
FIG. 9 is a waveform diagram showing a change state of a signal or voltage to be obtained at each part of the motor driving control device shown in FIG. 8.
Figure 10A:
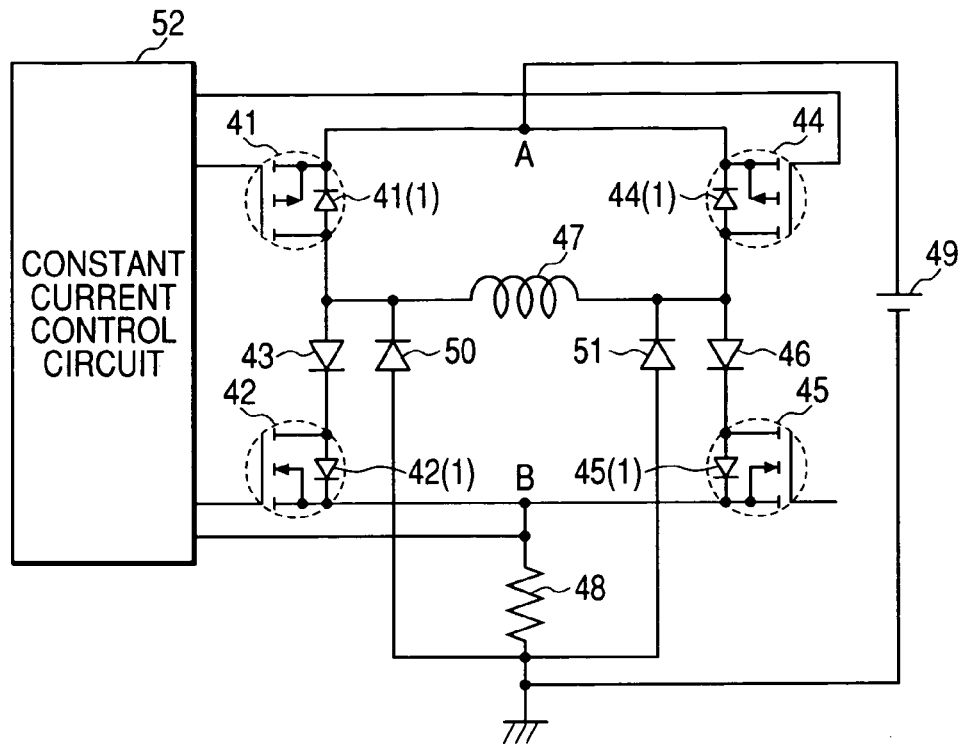
FIG. 10 is a circuit diagram showing a configuration of a motor driving circuit disclosed in JP-A-05-236797.
Figure 10B:
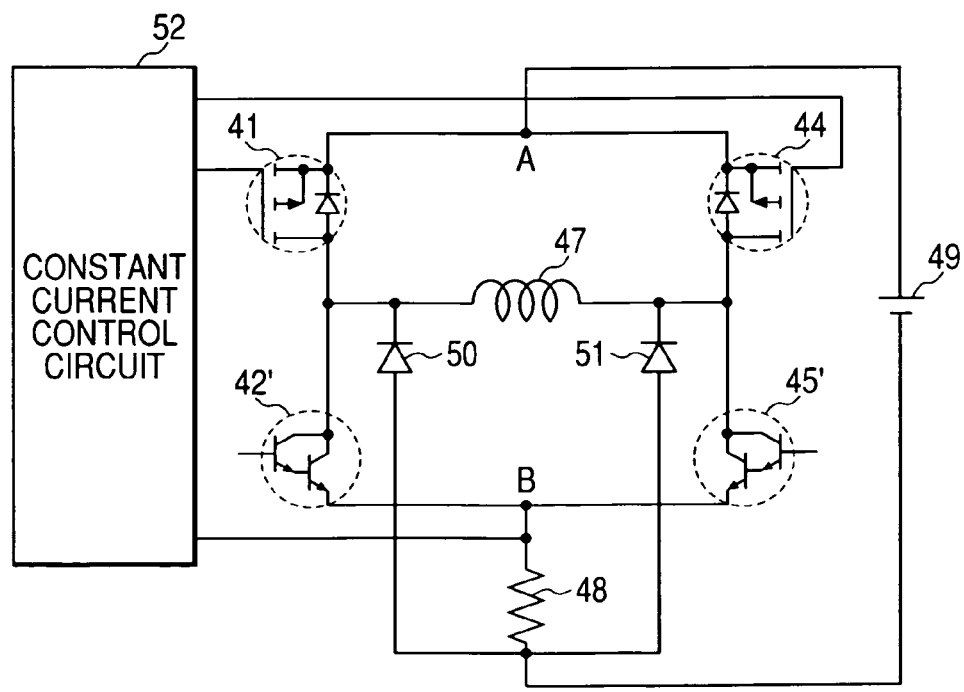
Figure 11:
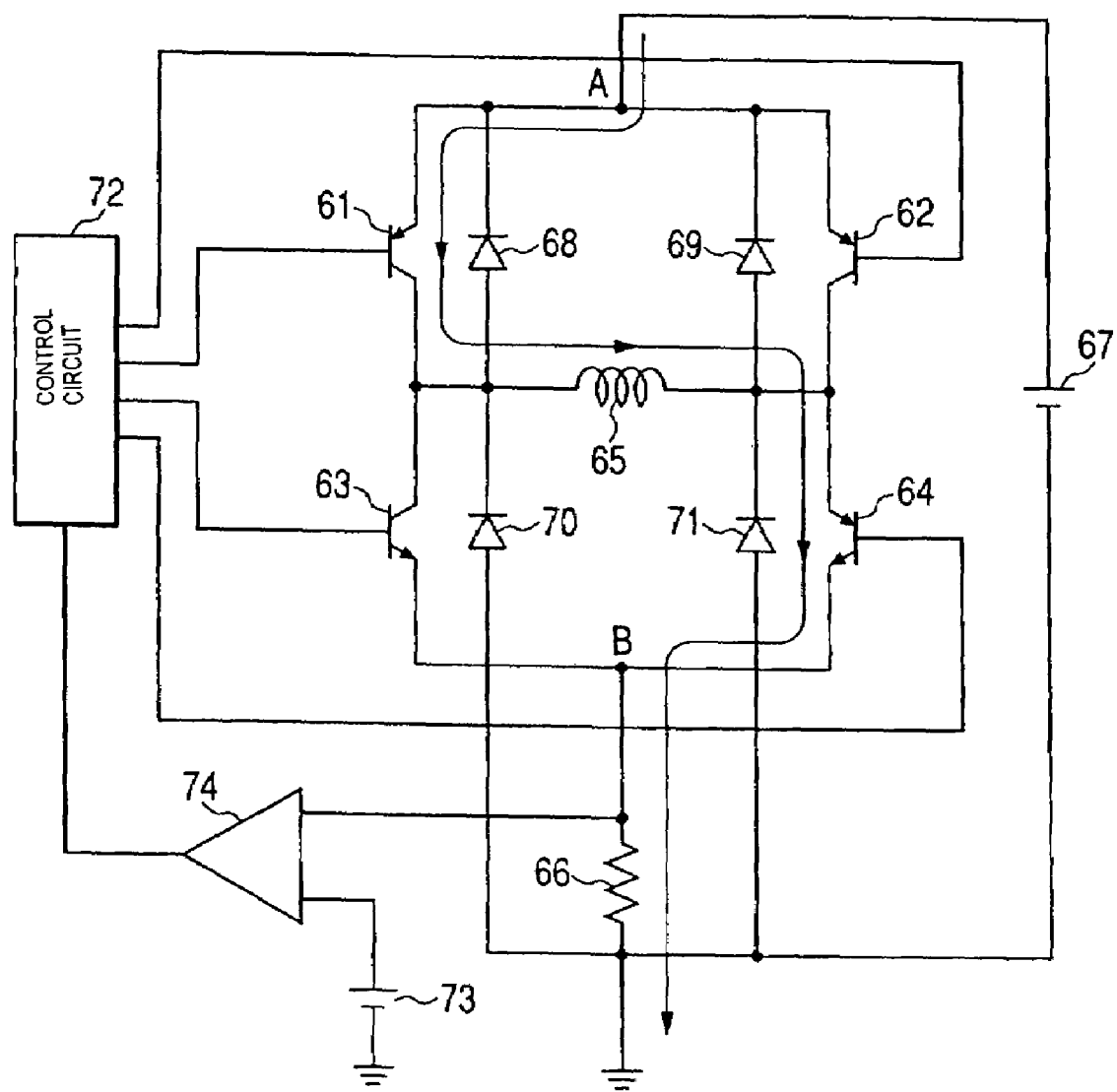
FIG. 11 is a circuit diagram showing a configuration of a motor driving circuit disclosed in JP-A-10-080194.

Next, FIG. 8 is a block diagram showing main parts in a fifth embodiment of a motor driving control device according to the invention. FIG. 9 is a waveform diagram showing a change state of a signal or voltage to be obtained in each part of the motor driving control device shown in FIG. 8.

As shown in FIG. 8, the motor driving control device according to the fifth embodiment includes a first motor driving unit 1A' and a second driving unit 1A", and a common motor driving control mechanism 1B', and first and second synchronous signal transmission lines 24(1) and 24(2). The first motor driving unit 1A' includes a direct-current motor 6' and has an on signal input terminal 25(1) and an off signal input terminal 25(2). Moreover, the basic configurations in the first motor driving unit 1A' and the second motor driving unit 1A" are the same as that of the motor driving unit 1A in the third embodiment, and thus the description thereof will be omitted. Further, a common power supply that supplies a driving current to the direct-current motor 6' and 6" is used.

The second motor driving unit 1A" includes the direct-current motor 6", and has an on signal input terminal 26(1) and an off signal input terminal 26(2). The common motor driving control mechanism 1B' has a first cycle signal output terminal 27(1) and a second cycle signal output terminal 27(2). And then, the first cycle signal transmission line 24(1) is connected between the first cycle signal output terminal 27(1) of the common motor driving control mechanism 1B', and the on signal input terminal 25(1) of the first motor driving unit 1A' and the off signal input terminal 26(2) of the second motor driving unit 1A". The second cycle signal transmission line 24(2) is connected between the second cycle signal output terminal 27(2) of the common motor driving control mechanism 1B', and the off signal input terminal 25(2) of the first motor driving unit 1A' and the on signal input terminal 26(1) of the second motor driving unit 1A". Moreover, the basis configuration in the common motor driving control mechanism 1B' is the same as that of the motor driving control mechanism 1B in the third embodiment, and thus the description thereof will be omitted. Further, the first cycle signal output terminal 27(1) and the second cycle signal output terminal 27(2) in the common motor driving control mechanism 1B' correspond to the two output terminals of the signal generator 19 in the third embodiment. A first current set output and a second current set output to be output from the setting unit 20 in the third embodiment are not shown in FIG. 8.

In this case, a first cycle signal output from the common driving control mechanism 1B' is supplied to the first cycle signal transmission line 24(1), and a second cycle signal output from the common motor driving control mechanism 1B' is supplied to the second cycle signal transmission line 24(2). The first cycle signal has a first polarity change portion, which cyclically arrives at an interval of predetermined time, and, similarly, the second cycle signal has a second polarity change portion, which cyclically arrives at an interval of predetermined time. When a time interval between one first polarity change portion and the next first polarity change portion is T, a time interval between one first polarity change portion and a second polarity change portion arriving immediately after that is T1, and a time interval between the second polarity change portion and the first polarity change portion arriving immediately after is T2, the conditions T1=T2, and T1+T2=T are established.

In FIG. 9, a first stage is the first cycle signal having the first polarity change portion that cyclically arrives, a second stage is the second cycle signal having the second polarity change portion that cyclically arrives, a third stage is a current target value to be supplied to the first motor driving unit 1A' and a current value of the motor 6', a fourth stage is a PWM driving state of the motor 6', a fifth stage is a current target value to be supplied to the second motor driving unit 1A" and a current value of the motor 6", and a sixth stage is a PWM driving state of the motor 6'.

Here, the operation of the motor driving control device shown in FIG. 8 will be described with reference to FIG. 9.

When the first motor driving unit 1A' and the second motor driving unit 1A" operate, the common motor driving control mechanism 1B' outputs the first cycle signal to the first cycle signal transmission line 24(1) and outputs the second cycle signal to the second cycle signal transmission line 24(2). The output first cycle signal and second cycle signal are supplied to the first motor driving unit 1A' and the second motor driving unit 1A", respectively.

At this time, if the first polarity change portion occurs in the first cycle signal, the first polarity change portion is supplied to the on signal input terminal 25(1) of the first motor driving unit 1A' and the off signal input terminal 26(2) of the second motor driving unit 1A". At this time, if the first motor driving unit 1A' is supplied with the first polarity change portion of the first cycle signal through the on signal input terminal 25(1), the motor 6' is changed from a non-driving state to a driving state, and thus the value of the current flowing in the motor 6' is sequentially increased. On the other hand, if the second motor driving unit 1A" is supplied with the first polarity change portion of the first cycle signal through the off signal input terminal 26(2), the motor 6" is changed from the driving state to the non-driving state, and thus the value of the current flowing in the motor 6" is sequentially decreased. And then, when the value of the current flowing in the motor 6' reaches the current target value, like the first operation example described above, the first motor driving unit 1A' is changed from the driving state to the non-driving state, and the value of the current flowing in the motor 6' is sequentially decreased. At this time, however, the second motor driving unit 1A" continues to sequentially decrease the value of the current flowing in the motor 6".

Subsequently, if the second polarity change portion occurs in the second cycle signal, the second polarity change portion is supplied to the off signal input terminal 25(2) of the first motor driving unit 1A' and the on signal input terminal 26(1) of the second motor driving unit 1A". At this time, if the second motor driving unit 1A" is supplied with the second polarity change portion of the second cycle signal through the on signal input terminal 26(1), the motor 6" is changed from the non-driving state to the driving state, and thus the value of the current flowing in the motor 6" is sequentially increased. On the other hand, if the first motor driving-unit 1A' is supplied with the second polarity change portion of the second cycle signal through the off signal input terminal 25(2), the motor 6' is maintained in the non-driving state, and the value of the current flowing in the motor 6' continues to be sequentially decreased.

Next, if the first polarity change portion occurs in the first cycle signal, the first polarity change portion is supplied to the on signal input terminal 25(1) of the first motor driving unit 1A' and the off signal input terminal 26(2) of the second motor driving unit 1A". At this time, if the first motor driving unit 1A' is supplied with the first polarity change portion of the first cycle signal through the on signal input terminal 25(1), the motor 6' is changed from the non-driving state to the driving state, and thus the value of the current flowing in the motor 6' is sequentially increased. On the other hand, if the second motor driving unit 1A" is supplied with the first polarity change portion of the first cycle signal through the off signal input terminal 26(2), the motor 6" is changed from the driving state to the non-driving state, and the value of the current flowing in the motor 6" is sequentially decreased.

Subsequently, in the first motor driving unit 1A' and the second motor driving unit 1A", the above-described operation is repeatedly executed. And then, as shown in FIG. 9, the average current values of the two motors 6' and 6" are repeatedly and alternately increased and decreased, and simultaneously the motors 6' and 6" become alternately the driving state and the non-driving state.

As such, in the motor driving control device according to the fifth embodiment, the first motor driving unit 1A' and the second motor driving unit 1A" are arranged in parallel with the power supply, and the first motor driving unit 1A' and the second motor driving unit 1A" are driven in a time division manner by use of the first cycle signal and the second cycle signal to be output from the common motor driving control mechanism 1B'. Therefore, it can be accurately configured with a simple configuration such that the currents flowing in the first motor driving unit 1A' and the second motor driving unit 1A" do not overlap each other in the time-variant manner, and thus the value of the total current flowing in the two motors 6' and 6" is not increased or the ripple components included in the power supply current is not made large. Moreover, in the motor driving control device according to the third embodiment, a duty ratio is set less than about half in a normal use state, and the joystick operating shaft is driven in an X direction and a Y direction perpendicular to each other by the two motors 6' and 6", such that a favorable operation result can be obtained.

Further, in the motor driving control device according to the fifth embodiment, the example in which the two direct-current motors 6' and 6" having the common power supply are driven has been described, but n, for example, three or more, direct-current motors having the common power supply may be driven. In this case, when the n direct-current motors are driven, each direct-current motor 6 may be caused to output a plurality of signals to be obtained by shifting its cycle by 1/n. Further, each direct-current motor may be driven by a signal of a cycle peculiar to the direct-current motor and may forcibly stop by a signal of the next cycle. At the time of this operation, the maximum duty ratio becomes 1/n.

According to the motor driving control device in the invention, the signal generating unit for generating the on signal having the polarity change portion arriving for every interval of predetermined time and the holding circuit for holding the circuit state are incorporated into the control unit. When the holding circuit detects the arrival of the polarity change portion of the on signal, the circuit state is held such that the on state of the switch unit is maintained. With the detection of the current detecting unit, when it is detected that the current of the motor is increased up to the target current value, the held circuit state is released such that the switch unit is in the off state. Accordingly, the motor is driven according to the polarity change portion of the on signal supplied with a predetermined timing, and driving of the motor stops when the current value of the motor reaches the target current value. Therefore, the current value of the motor can be maintained at the predetermined value, and thus, unlike the related art, the regenerative current of the motor does not need to be accurately detected at the time of the control. As a result, since the circuit configuration of the related art does not need to be provided and an inexpensive FET is used, the number of components can be reduced. Further, the motor can be driven at the constant cycle, and thus the jarring noise can be suppressed.

Further, according to the motor driving control device of the invention, the signal generating unit for generating the cycle signal having the first polarity change portion and the second polarity change portion alternately presenting for each interval of predetermined time is provided in the motor driving control mechanism, and the holding circuit for holding the circuit state is incorporated in the motor driving unit. When the holding circuit detects the arrival of the first polarity change portion of the cycle signal, the circuit state is held such that the on state of the switch unit is maintained. Further, at the earlier time from the time when the arrival of the second polarity change portion of the cycle signal is detected and the time when it is detected through the detection of the current detecting unit that the current of the motor is increased up to the target current value, the circuit state is held such that the switch unit is in the off state. Further, the motor is driven according to the first polarity change portion of the cycle signal to be supplied with the predetermined timing. In addition, at the earlier time from the time when the second polarity change portion of the cycle signal to be supplied with the predetermined timing arrives and the time when the current value of the motor reaches the target current value, driving the motor stops. Therefore, the average current value of the motor can be maintained at the predetermined value, without causing the change cycle of driving and non-driving of the motor to be made longer than the arrival interval of the first polarity change portion of the cycle portion. Further, unlike the above-described motor driving device, the regenerative current does not need to be accurately detected, and an unnecessary noise to be generated at the time of the operation can be reduced.

In addition, according to the motor driving control device of the invention, the first motor driving unit and the second motor driving unit are arranged in parallel with the power supply, and the first motor driving unit and the second motor driving unit are driven by use of the first cycle signal and the second cycle signal to be output from the motor driving control mechanism in a time division manner. Therefore, the increase/decrease states of the current average values of the current flowing in the motors of the first motor driving unit and the second driving unit do not overlap in a time-variant manner, and the total current value of the current flowing in the two motors is not temporarily increased, or the ripple component of the power supply current is not increased. Further, if the joystick operating shaft is driven by the two motors having the motor driving control device, a favorable operation result can be obtained.

The invention claimed is:

1. A motor driving control device comprising:
a motor;
a switch unit that controls on/off of an one-directional current flowing in a motor;
a current detecting unit that is connected in series to the motor so as to detect the value of the current of the motor and to output a detection voltage; and
a control unit that incorporates a signal generating unit for generating an on signal having a polarity change portion formed at an interval of predetermined time and a holding circuit for holding a circuit state,
wherein, when the arrival of the polarity change portion of the on signal is detected, the holding circuit holds the circuit state such that the switch unit is turned on and the current is supplied to the motor, and
when it is detected through the detection of the current detecting unit that the current of the motor is increased up to a target current value, the holding circuit releases the held circuit state such that the switch unit is turned off.

2. The motor driving control device according to claim 1, wherein the switch unit has two first switch units and two second switch units that are brought into bridge connection so as to control on/off the one-directional current or a reverse current selectively flowing in the motor.

3. The motor driving control device according to claim 1, wherein the control unit has a comparing unit that compares a current detection signal detected by the current detecting unit with a target value signal to be input from the outside, when the current detection signal does not reach the target value signal, becomes an open output state, and, when the current detection signal exceeds the target value signal, generates a low-level output,
the on signal is supplied to the holding circuit, together with the output of the comparing unit, and
the holding circuit holds the circuit state when the on signal is supplied, and may release the held circuit state when the low-level output is supplied.

4. The motor driving control device according to claim 1, wherein the switch unit has MOSFETs.

5. A motor driving control device comprising:
a motor;

a switch unit that is connected between the motor and a power supply so as to control on/off a current of the motor;

a current setting unit that sequentially increases the current of the motor from a current value of the motor at the time of being turned on up to a target value in order to set driving force of the motor to a predetermined value;

a motor driving unit that has a current detecting unit for detecting the current value of the motor;

a signal generating unit that generates a cycle signal having a first polarity change portion and a second polarity change portion alternately presenting for every interval of predetermined time; and a motor driving control mechanism that has a control unit for turning on the switch unit when the first polarity change portion of the cycle signal arrives and for turning off the switch unit at an earlier time from a time when the second polarity change portion of the cycle signal arrives and a time when the current of the motor is increased up to the target value.

6. The motor driving control device according to claim 5, further comprising:

a second motor;

a second switch unit that is connected between the second motor and the power supply so as to control on/off a current of the second motor;

a second current setting unit that sequentially increases the current of the second motor from a current value of the second motor at the time of being turned on up to a target value in order to set driving force of the second motor to a predetermined value; and a second motor driving unit that has a second current detecting unit for detecting the current value of the second motor, wherein the control unit of the motor driving control mechanism performs control such that the second switch unit is turned on when the second polarity change portion of the cycle signal arrives, and the second switch unit is turned off at the earlier time from a time when the second polarity change portion of the cycle signal arrives and a time when the current of the second motor is increased up to the target value.

7. The motor driving control device according to claim 5, wherein, in the cycle signal, a time from the time of the arrival of the first polarity change portion to the time of the arrival of the second polarity change portion immediately after that is the same as a time from the time of the arrival of the second polarity change portion to the time of the arrival of the first polarity change portion immediately after that.

* * * * *